US012279233B2

(12) United States Patent
Ji (10) Patent No.: US 12,279,233 B2
(45) Date of Patent: Apr. 15, 2025

(54) TRANSMISSION METHOD AND TERMINAL FOR CHANNEL MEASUREMENT REFERENCE SIGNAL (71) Applicant: VIVO MOBILE COMMUNICATION CO., LTD., Dongguan (CN)

(72) Inventor: Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 321 days.

(21) Appl. No.: 17/740,335

(22) Filed: May 9, 2022

(65) Prior Publication Data
US 2022/0272670 A1 Aug. 25, 2022

Related U.S. Application Data (63) Continuation of application No. PCT/CN2020/138804, filed on Dec. 24, 2020.

(30) Foreign Application Priority Data

Dec. 25, 2019 (CN) .......................... 201911360708.7

(51) Int. Cl.
*H04W 4/00* (2018.01)
*H04L 5/00* (2006.01)
(Continued)

(52) U.S. Cl.
CPC ........... *H04W 72/02* (2013.01); *H04L 5/0012* (2013.01); *H04L 5/0051* (2013.01); *H04W 24/10* (2013.01);
(Continued)

(58) Field of Classification Search
CPC . H04W 72/02; H04W 24/10; H04W 72/0446; H04W 72/0453; H04W 4/40;
(Continued)

(56) References Cited

U.S. PATENT DOCUMENTS

2017/0339707 A1* 11/2017 Murakami ............ H04W 16/14
2019/0141546 A1* 5/2019 Zhou ....................... H04L 5/001
(Continued)

FOREIGN PATENT DOCUMENTS

| CN | 102204293 A | 9/2011 |
|---|---|---|
| CN | 107733609 A | 2/2018 |

(Continued)

OTHER PUBLICATIONS

International Search Report issued in corresponding International Application No. PCT/CN2020/138804, mailed Mar. 22, 2021, 6 pages.
(Continued)

*Primary Examiner* — Phuongchau Ba Nguyen
(74) *Attorney, Agent, or Firm* — IPX PLLC (57) ABSTRACT

Provided in the present disclosure are a method and terminal for transmitting a channel measurement reference signal. The method includes: transmitting a target signal in all or part of frequency domain bandwidth of a sidelink according to target configuration information, where the target signal includes the channel measurement reference signal.

18 Claims, 6 Drawing Sheets

(51) Int. Cl.
*H04W 24/10* (2009.01)
*H04W 72/02* (2009.01)
*H04W 72/0446* (2023.01)
*H04W 72/0453* (2023.01)

(52) U.S. Cl.
CPC ... *H04W 72/0446* (2013.01); *H04W 72/0453* (2013.01)

(58) Field of Classification Search
CPC . H04W 24/02; H04W 52/52; H04W 72/0457; H04W 72/1263; H04W 72/25; H04W 24/08; H04W 28/04; H04W 72/04; H04W 72/042; H04W 88/08; H04W 28/08; H04W 28/084; H04W 36/22; H04W 72/12; H04L 5/0012; H04L 5/0051; H04L 5/001; H04L 5/0053; H04L 27/261; H04L 5/0048; H04L 5/0007
See application file for complete search history.

(56) References Cited

U.S. PATENT DOCUMENTS

| | | | | |
|---|---|---|---|---|
| 2019/0173646 | A1* | 6/2019 | Wu | H04L 25/0224 |
| 2019/0364585 | A1* | 11/2019 | Lee | H04W 4/40 |
| 2020/0221306 | A1* | 7/2020 | Chen | H04W 16/14 |
| 2021/0176762 | A1* | 6/2021 | Islam | H04B 7/0626 |
| 2022/0217684 | A1* | 7/2022 | Zhao | H04W 72/02 |

FOREIGN PATENT DOCUMENTS

| | | |
|---|---|---|
| CN | 109565714 A | 4/2019 |
| CN | 109644455 A | 4/2019 |
| CN | 110100496 A | 8/2019 |
| CN | 110199487 A | 9/2019 |
| CN | 110380828 A | 10/2019 |
| CN | 110381599 A | 10/2019 |
| CN | 110535611 A | 12/2019 |
| EP | 4016905 A1 | 6/2022 |
| WO | 2017171895 A1 | 10/2017 |
| WO | 2019203609 A1 | 10/2019 |

OTHER PUBLICATIONS

CATT, "Discussion on resource allocation mechanism in NR V2X", 3GPP TSG RAN1 Meeting #95 R1-1812620, Nov. 16, 2018.
First Office Action issued in related Chinese Application No. 201911360708.7, mailed Mar. 18, 2022, 10 pages.
Extended European Search Report issued in related European Application No. 20904509.5, mailed Dec. 23, 2022, 9 pages.
Huawei et al, "Sidelink physical layer structure for NR V2X", 3GPP TSG RAN WG1 Meeting #99, R1-1911882, Nov. 2019, 35 pages.
Huawei et al, "Sidelink CSI ", 3GPP TSG RAN WG1 Meeting #98, R1-1909438, Aug. 2019, 9 pages.
Second Office Action issued in related Chinese Application No. 201911360708.7, mailed Nov. 10, 2022, 9 pages.

* cited by examiner

TRANSMISSION METHOD AND TERMINAL FOR CHANNEL MEASUREMENT REFERENCE SIGNAL

CROSS-REFERENCE TO RELATED APPLICATIONS

This application is a continuation of International Application No. PCT/CN2020/138804, filed Dec. 24, 2020, which claims priority to Chinese Patent Application No. 201911360708.7, filed Dec. 25, 2019. The entire contents of each of the above-referenced applications are expressly incorporated herein by reference.

TECHNICAL FIELD

The present disclosure relates to the field of communications technologies, and in particular to a transmission method and terminal for a channel measurement reference signal.

BACKGROUND

Conventional V2X sidelink transmission is dominated by broadcast services. Therefore, channel state measurement is not performed, and link state information cannot be obtained. Transmission parameters cannot be selected according to an actual link state, and the problem of resource waste or transmission failure tends to occur. Therefore, the prior art has the problem that sidelink transmission has relatively low reliability.

SUMMARY

According to a first aspect, embodiments of the present disclosure provide a transmission method for a channel measurement reference signal, applied to a terminal, and including:

transmitting a target signal in all or part of frequency domain bandwidth of a sidelink according to target configuration information, where the target signal includes a channel measurement reference signal.

According to a second aspect, the embodiments of the present disclosure provide a terminal, including:

a transmission module, configured to transmit a target signal in all or part of frequency domain bandwidth of a sidelink according to target configuration information, where the target signal includes a channel measurement reference signal.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings.

DETAILED DESCRIPTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

In addition, the terms "include" and any variant thereof in the description and claims of the present application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

The following describes the embodiments of the present disclosure with reference to the accompanying drawings. A terminal in a transmission method for a channel measurement reference signal provided in embodiments of the present disclosure is applicable to a wireless communication system. The wireless communication system may be a 5G system, an Evolved Long Term Evolution (eLTE) system, or a subsequent evolved communication system.

Figure 1:
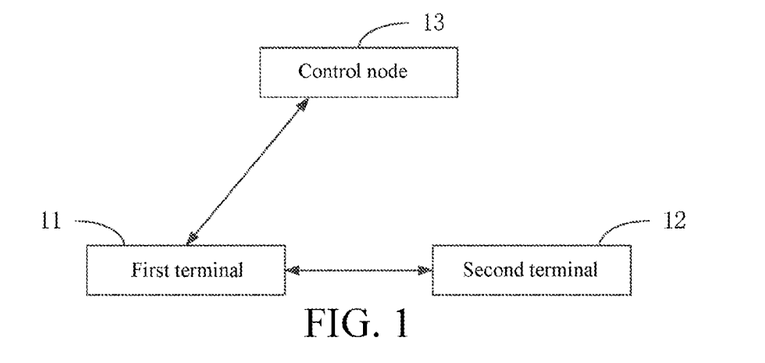
FIG. 1 is a structural diagram of a network system to which the embodiments of the present disclosure are applicable.

FIG. 1 is a structural diagram of a network system to which the embodiments of the present disclosure are applicable. As shown in FIG. 1, the network system includes a first terminal 11, a second terminal 10, and a control node 13. The first terminal 11 and the second terminal 10 may be user terminals or other terminal side devices, for example, terminal side devices such as mobile phones, tablet personal computers, laptop computers, personal digital assistants (PDA), Mobile Internet Device (MID), or wearable devices. It needs to be noted that in the embodiments of the present disclosure, specific types of the first terminal 11 and the second terminal 10 are not limited. The first terminal 11 may be understood as a transmit end of a sidelink (SL), and the second terminal 10 may be understood as a receive end of the sidelink. The foregoing control node 13 may be a network device or a terminal side device. The network device may be a 5G base station, or a base station of a later version, or a base station in another communication system, or referred to as a node B, an evolved node B, or a Transmission Reception Point (TRP), or an Access Point (AP), or another word in the field. As long as the same technical effect is achieved, the network device is not limited to a specific technical word. In addition, the network device may be a Master Node (MN) or a Secondary Node (SN). It needs to be noted that only a 5G base station is used as an example in the embodiments of the present disclosure, but a specific type of the network device is not limited.

Figure 2:
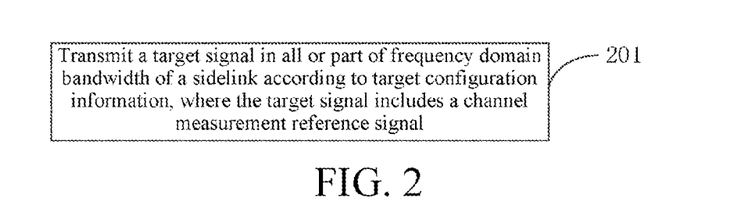
FIG. 2 is a flowchart of a transmission method for a channel measurement reference signal according to an embodiment of the present disclosure.

FIG. 2 is a flowchart of a transmission method for a channel measurement reference signal according to an embodiment of the present disclosure. The method is applied to a terminal. As shown in FIG. 2, the method includes the following steps.

Step 201: Transmit a target signal in all or part of frequency domain bandwidth of a sidelink according to target configuration information, where the target signal includes a channel measurement reference signal.

In the embodiments of the present disclosure, the foregoing target configuration information may be configured or preconfigured or may be specified in a protocol. The target configuration information is used for configuring that the terminal transmits the channel measurement reference signal in all or part of the frequency domain bandwidth of the sidelink. The channel measurement reference signal may be understood as a Channel State Information Reference Signal (CSI-RS) or Channel State Information Interference Measurement (CSI-IM). The CSI-RS may include a Non-Zero Power (NZP) CSI-RS or a ZP CSI-RS. It should be noted that the foregoing CSI-RS is transmitted in the sidelink, and therefore may be referred to as an SL CSI-RS.

In the embodiments of the present disclosure, target configuration information is set for a terminal to transmit a channel measurement reference signal in all or part of frequency domain bandwidth of a sidelink based on the target configuration information, thereby implementing channel state measurement of the sidelink. Therefore, the embodiments of the present disclosure can effectively improve the reliability of sidelink transmission.

It should be understood that a specific form of the foregoing target configuration information may be set according to an actual requirement. For example, in an embodiment, the foregoing target configuration information includes a time domain configuration of the target signal and a frequency domain configuration of the target signal.

In some embodiments, the target signal further includes an automatic gain control AGC signal, and the time domain configuration is used for configuring a quantity of first time domain units occupied by the channel measurement reference signal and a quantity of first time domain units occupied by the AGC signal within a second time domain unit for transmitting the target signal.

In other words, the foregoing target configuration information is used for configuring x first time domain units and configuring y first time domain units. For example, the first time domain unit may be a symbol. That is, the target configuration information is used for configuring that the channel measurement reference signal occupies x symbols and the AGC signal occupies y symbols. Specific values of x and y may be specified in a protocol or configured (preconfigured), and are not further limited here. For example, y=0, y=0.5, or y=1.

Content of the first time domain units occupied by the AGC signal may be filled through UE implementation, or content of the first time domain units occupied by the AGC signal may be specified in a protocol or configured (preconfigured) (for example, an $x^{th}$ CSI-RS sequence may be copied into the first time domain units occupied by the AGC signal, or a fixed CSI-RS sequence may be filled. Further, a corresponding CSI-RS sequence generated according to a configuration (preconfiguration) of a CSI-RS may be filled in the first time domain units occupied by the AGC signal). In the embodiments of the present disclosure, the x first time domain units and the y first time domain units are configured by using the target configuration information, to meet a requirement that SL transmission has power changes at different moments and AGC needs to be readjusted.

In some embodiments, the time domain configuration is used for configuring that the second time domain unit for transmitting the target signal includes at least one resource set, and the resource set includes a combination formed by binding the first time domain units occupied by the channel measurement reference signal and the first time domain units occupied by the AGC signal.

The second time domain unit may be understood as a slot or a sub-slot, or may be referred to as an SL slot or an SL sub-slot, or may be referred to as a logical slot or a logical sub-slot. In this embodiment, a combination of the first time domain units occupied by the channel measurement reference signal and the first time domain units occupied by the AGC signal may be bound to form a resource set of the channel measurement reference signal and AGC. It should be understood that one resource set may include one or more first time domain units occupied by the channel measurement reference signal and one or more first time domain units occupied by the AGC signal.

In some embodiments, in an embodiment, the foregoing resource set may meet at least one of the following:

in the resource set, the first time domain units occupied by the channel measurement reference signal are located following the first time domain units occupied by the AGC signal; or in the resource set, the first time domain units occupied by the channel measurement reference signal and the first time domain units occupied by the AGC signal are adjacent in time domain.

Further, in an embodiment, when a quantity of the resource sets is greater than 1, the resource sets are consecutive in time domain.

Figure 3:
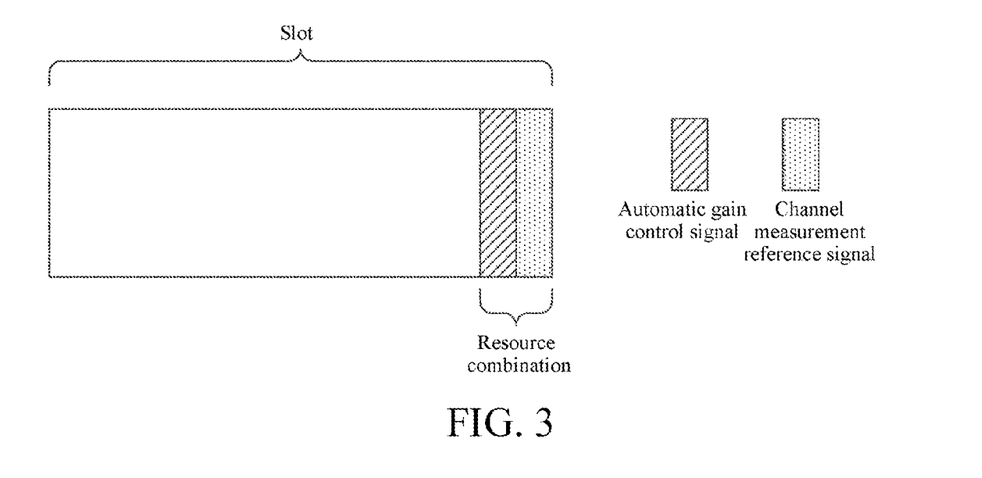
FIG. 3 is an example diagram 1 of resource set transmission in a transmission method for a channel measurement reference signal according to an embodiment of the present disclosure.
Figure 4:
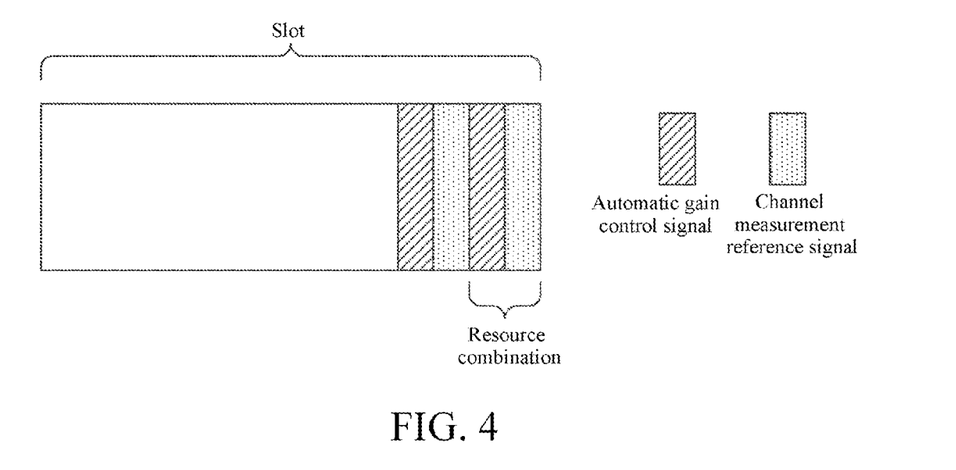
FIG. 4 is an example diagram 2 of resource set transmission in a transmission method for a channel measurement reference signal according to an embodiment of the present disclosure.

For example, the resource set is formed by one AGC symbol and one CSI-RS symbol. One resource set may be configured for each slot by using the foregoing target configuration information. For details, refer to FIG. 3. Two resource sets may be configured for each slot by using the foregoing target configuration information. For details, refer to FIG. 4.

In some embodiments, a position of the resource set in the second time domain unit may be set according to an actual requirement. For example, in an embodiment of the present disclosure, the position of the at least one resource set in the second time domain unit meets any one of the following:

N first time domain units occupied by the at least one resource set are N first time domain units located at the end of the second time domain unit, where N is a positive integer;

N first time domain units occupied by the at least one resource set are located at any positions in the second time domain unit; or N first time domain units occupied by the at least one resource set are located following the last first time domain unit occupied by a Physical Sidelink Shared Channel (PSSCH).

In some embodiments, when N first time domain units occupied by the at least one resource set are located at any positions in the second time domain unit, a manner in the following may be used for configuration:

configuring an offset relative to a start moment of the second time domain unit; or specifying in a protocol that a first time domain unit used for transmitting a resource set is a symbol with a target resource removed. The target resource includes at least one of the following:

a PSSCH symbol, an AGC symbol preceding a PSSCH symbol, an AGC symbol following a PSSCH symbol, a physical sidelink feedback channel symbol (PSFCH symbol), or a Guard Period symbol (GP symbol).

In some embodiments, a period and an offset of the second time domain unit of the resource set may be defined in a protocol or may be configured or preconfigured. For example, a configuration may be performed based on a Bandwidth Part (BWP) (that is, per BWP) or based on a resource pool (that is, per resource pool).

It should be understood that the foregoing target configuration information may be separately configured for each antenna panel or antenna port. In other words, the time domain configuration corresponds one to one to a second object, and the second object is an antenna panel or an antenna port.

In some embodiments, a first object in each first time domain unit of the resource set is kept unchanged, and the first object includes at least one of the following:

a transmit power;

a precoder;

a matrix; or an antenna panel.

Figure 5:
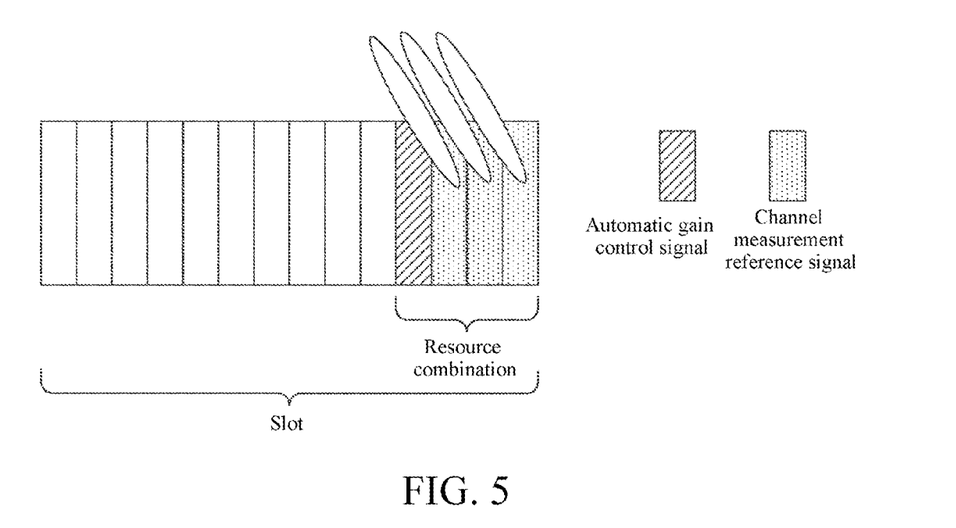
FIG. 5 is an example diagram 3 of resource set transmission in a transmission method for a channel measurement reference signal according to an embodiment of the present disclosure.
Figure 6:
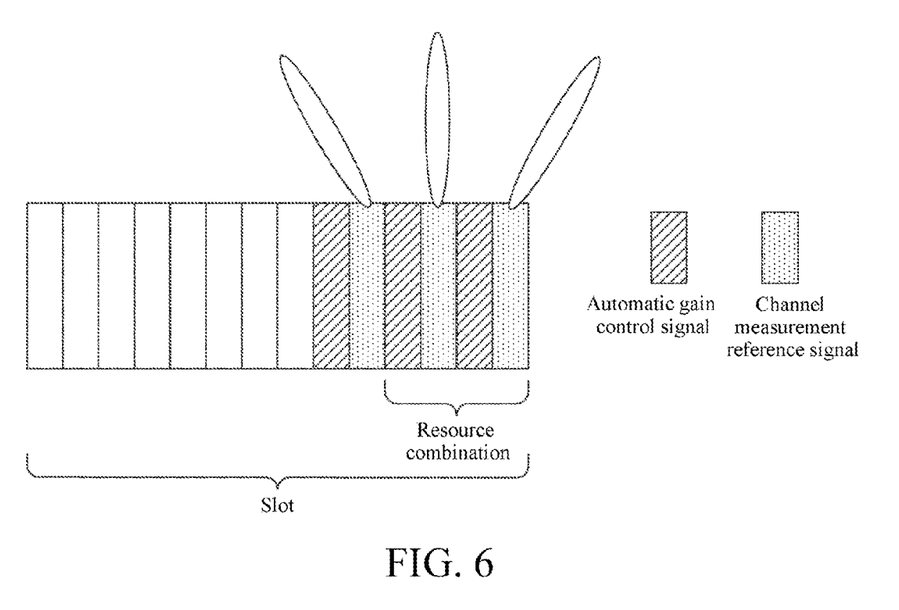
FIG. 6 is an example diagram 4 of resource set transmission in a transmission method for a channel measurement reference signal according to an embodiment of the present disclosure.

In an embodiment, the resource set is formed by one AGC symbol and three CSI-RS symbols. One resource set is included in a slot. The same precoder needs to be used for transmission on the three CSI-RS symbols in the slot. Details are shown in FIG. 5. In another embodiment, the resource set is formed by one AGC symbol and one CSI-RS symbol. Three resource sets are included in a slot. Different precoders may be used for transmission on the three CSI-RS symbols in the set. Details are shown in FIG. 6.

In some embodiments, the resource set and a third object are time division multiplexed or frequency division multiplexed, and the third object is at least one of a physical sidelink control channel PSCCH, a PSSCH, or a physical sidelink feedback channel PSFCH.

In an embodiment, in a case that the third object is the PSCCH or the PSSCH and the resource set and the third object are time division multiplexed, the third object and the resource set meet any one of the following:

a time domain resource configuration of the third object does not include the resource set; or in a case that transmission of the third object and transmission of the resource set conflict in time domain, rate matching or puncturing is performed on the transmission of the third object.

In another embodiment, in a case that the third object is the PSFCH and the resource set and the third object are time division multiplexed, the third object and the resource set meet any one of the following:

AGC signals of the third object and the resource set are in the same first time domain unit; or in a case that transmission of the third object and transmission of the resource set conflict in time domain, the transmission of the third object or the transmission of the resource set is discarded.

In the embodiments of the present disclosure, a multiplexing manner between a resource set and a PSCCH, a PSSCH, and a PSFCH is specified, so that the reliability of transmitting a resource set can be ensured.

In some embodiments, the frequency domain configuration is used for configuring that a frequency domain resource of the target signal is bandwidth of a BWP, resource pool bandwidth or bandwidth of a carrier.

In some embodiments, a frequency hopping manner may be used to expand a frequency coverage area in the transmission of the foregoing target signal, to implement the configuration of a broadband SL CSI-RS. Specifically, the division of the frequency domain resource may be specified in a protocol or may be configured or preconfigured. In the embodiments of the present disclosure, the frequency domain resource includes M sub-bands, and M is an integer greater than 1.

In some embodiments, the M sub-bands meet at least one of the following:

each sub-band has the same quantity of frequency domain resources; or the sub-band is a basic unit of transmitting the target signal.

It should be understood that the implementation of the frequency hopping manner may be set according to an actual requirement. For example, in the embodiments of the present disclosure, during the transmission of the target signal, a manner of performing frequency hopping in the M sub-bands includes any one of the following:

performing frequency hopping in a resource set;

performing frequency hopping between resource sets;

performing frequency hopping in a time domain unit; or performing frequency hopping between time domain units, where the resource set includes a combination formed by binding one first time domain unit occupied by the channel measurement reference signal and one first time domain unit occupied by an AGC signal.

It should be understood that reference may be made to the related art for a sequence of an SL CSI-RS, resource mapping, antenna port mapping, and the like. Details are not described herein again.

It should be noted that an indication manner of the foregoing frequency domain resource of the target signal may be set according to an actual requirement. For example, in an embodiment, the frequency domain configuration is further used for indicating a frequency domain resource of the target signal according to at least one of the following:

the frequency domain resource is indicated based on a BWP;

the frequency domain resource is indicated based on a resource pool;

the frequency domain resource is indicated based on a carrier; or the frequency domain resource is indicated based on a sub-channel.

It should be understood that in a case that the foregoing target configuration information is configured, specifically, the target configuration information may be directly configured, and a control node is relayed to a receive end through a transmit end. Alternatively, after determining target configuration information corresponding to a receive end, a transmit end transmits the target configuration information to the receive end. The foregoing target configuration information is transmitted by the control node. The control node may be a uu control node or may be a sidelink control node. Several cases in the following may be included:

Case 1: The control node notifies the target configuration information of each link to the transmit end and the receive end.

For example, the control node may use signaling such as (PC5-)RRC, a Medium Access Control Control Element (MAC CE), DCI, or Sidelink Control Information (SCI). The signaling needs to include at least the following information:

link information, for example, UE IDs of the transmit end and the receive end; and transmit and receive end indication information, for example, a 1-bit flag (flag).

Case 2: The control node notifies the target configuration information of each link to the transmit end, and then the transmit end relays the target configuration information to the receive end.

For example, the control node may notify the target configuration information to the transmit end by using signaling such as (PC5-)RRC, a MAC CE, DCI or SCI. Moreover, the signaling needs to include at least the following information: link information, for example, UE IDs of the transmit end and the receive end.

The transmit end may notify the target configuration information to the receive end by using signaling such as PC5-RRC, a MAC CE or SCI.

Case 3: The control node configures a group of usable configuration information for the transmit end, and the transmit end determines the target configuration information of each link.

For example, the control node may notify the target configuration information to the transmit end by using signaling such as (PC5-)RRC, a MAC CE, DCI or SCI. Moreover, the signaling needs to include at least the following information: link information, for example, UE IDs of the transmit end and the receive end.

The transmit end may notify the target configuration information to the receive end by using signaling such as PC5-RRC, a MAC CE or SCI.

Case 4: The transmit end determines the target configuration information of each link, and notifies the target configuration information to the receive end.

For example, the transmit end may notify the target configuration information to the receive end by using signaling such as PC5-RRC, a MAC CE or SCI.

In the first embodiment, for the foregoing Cases 1 to 3, in a case that the terminal is a transmit end of sidelink transmission, before the target signal is transmitted in all or part of the frequency domain bandwidth of the sidelink according to the target configuration information, the method further includes:

receiving a first configuration corresponding to each sidelink transmitted by a control node, where the first configuration includes the target configuration information.

In some embodiments, in the embodiments of the present disclosure, for the foregoing Case 2, after the receiving a first configuration corresponding to each sidelink transmitted by a control node, the method further includes:

forwarding the corresponding target configuration information to a receive end of the sidelink transmission.

Further, in the embodiments of the present disclosure, for the foregoing Case 3, the first configuration includes at least two second configurations, and the target configuration information is one configuration determined by the terminal from the at least two second configurations.

In the second embodiment, for the foregoing Case 4, in a case that the terminal is a transmit end of sidelink transmission, before the target signal is transmitted in all or part of the frequency domain bandwidth of the sidelink according to the target configuration information, the method further includes:

determining the target configuration information corresponding to each time of sidelink transmission; and transmitting the corresponding target configuration information to a receive end of the sidelink transmission.

In the third embodiment, for the foregoing Cases 1 to 4, in a case that the terminal is a receive end of sidelink transmission, before the target signal is transmitted in all or part of the frequency domain bandwidth of the sidelink according to the target configuration information, the method further includes any one of the following:

receiving a first configuration corresponding to each sidelink transmitted by a control node, where the first configuration includes the target configuration information; and receiving the target configuration information transmitted by a transmit end of the sidelink transmission.

Further, in an optional embodiment, the target configuration information is used for configuring that the channel measurement reference signal is carried by a PSSCH, and a frequency hopping rule is preset to transmit the target signal.

In some embodiments, in the embodiments of the present disclosure, the frequency domain bandwidth includes K sub-bands, and K is an integer greater than 1; and one second time domain unit for transmitting the target signal includes L third time domain units, and L is an integer greater than 1.

In the embodiments of the present disclosure, the frequency domain bandwidth may be bandwidth of each resource pool or bandwidth of a BWP or bandwidth of a carrier.

The division may be specified/(pre)configured in a standard. For example, one/more parameters in the following are configured:

bandwidth (for example, a quantity of PRBs/sub-channels) of a sub-band;

a start position (for example, a start position of PRBs/sub-channels) of a sub-band; and a sub-band carrier.

Each second time domain unit is divided into a plurality of third time domain units (or may be understood as sub-time domain units).

The division may be specified/(pre)configured in a standard. For example, one/more parameters in the following are configured:

a length (for example, a quantity of symbols) of a third time domain unit;

a start position (for example, a start position of symbols) of a third time domain unit;

an interval of a third time domain unit.

Each sub-time domain unit may carry the channel measurement reference signal.

In some embodiments, the performing frequency hopping between the sub-bands in transmission of each third time domain unit includes:

performing frequency hopping according to $T\_i=(T\_1+(i-1)*Q) \bmod K$, where i is an integer greater than 1 and less than or equal to L, $T\_i$ denotes a sub-band corresponding to an $i^{th}$ third time domain unit, $T\_1$ denotes a sub-band corresponding to the first third time domain unit, and Q denotes a step size of the frequency hopping.

Figure 7:
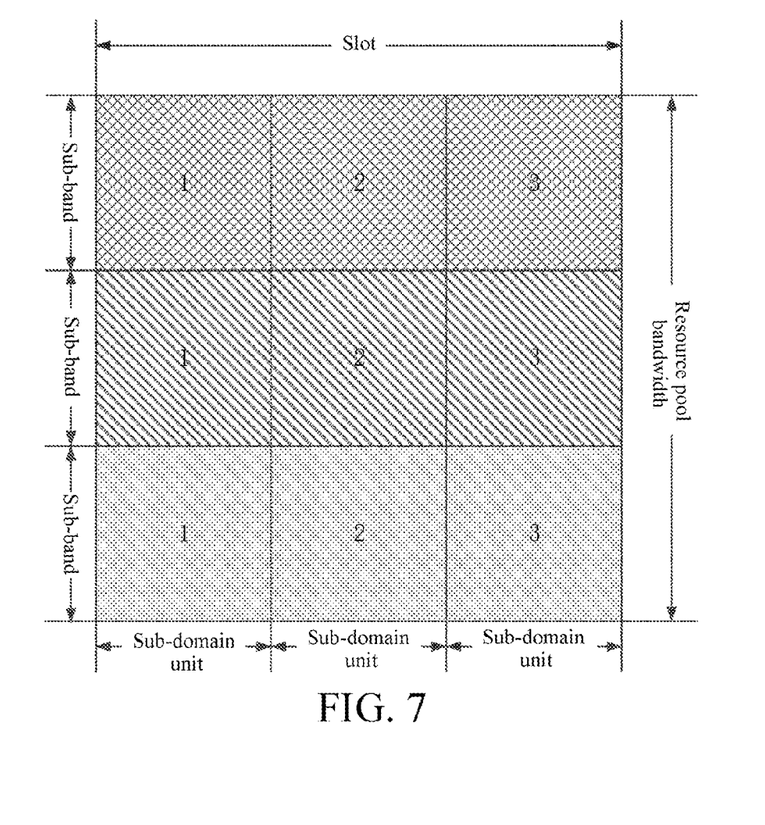
FIG. 7 is an example diagram of resource set transmission in a conventional transmission method for a channel measurement reference signal.
Figure 8:
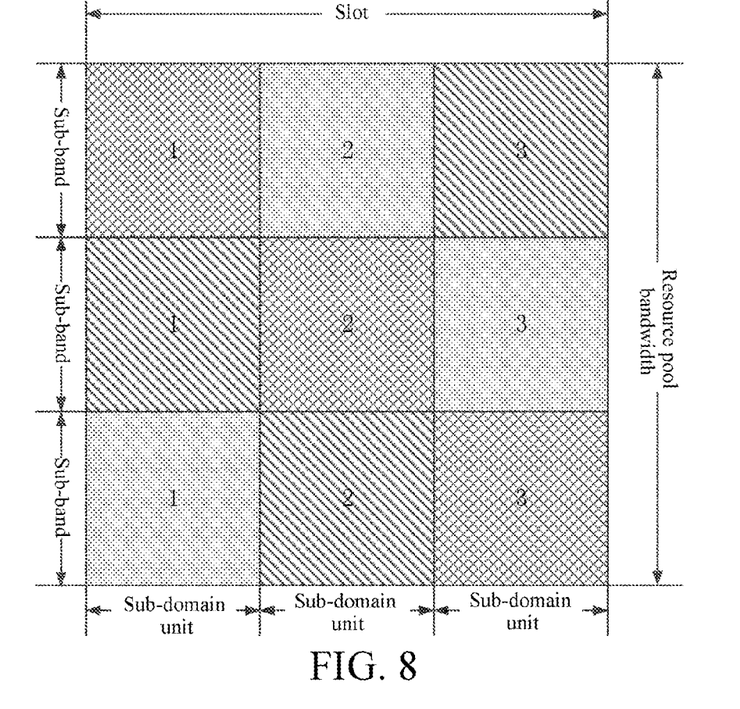
FIG. 8 is an example diagram 1 of resource set transmission in a transmission method for a channel measurement reference signal according to an embodiment of the present disclosure.

For example, each slot is divided into three third time domain units, and a resource pool is divided into three sub-bands. In an embodiment, in a case that transmission of a PSSCH is non-frequency hopping transmission, as shown in FIG. 7, a number in the figure represents an $n^{th}$ third time domain unit. In another embodiment, transmission of a PSSCH is frequency hopping transmission, and a step size of frequency hopping is one sub-band. The transmission of a PSSCH after frequency hopping becomes broadband transmission, and a CSI-RS carried in the transmission may be used for measuring broadband CSI. As shown in FIG. 8, a number in the figure represents an $n^{th}$ third time domain unit.

In the embodiments of the present disclosure, frequency hopping transmission of a PSSCH is used to carry a channel measurement reference signal. In this way, a terminal does not need to separately select a transmission resource for a channel measurement reference signal, so that the complexity of resource selection and an interference problem or a conflict problem in resource reselection are avoided.

For better understanding of the present disclosure, specific implementations of the present disclosure are described below in detail through specific examples.

Solution 1: configure a broadband SL CSI-RS.

1.1 Time Domain Configuration of an SL CSI-RS

In some embodiments, a quantity of symbols occupied by an SL CSI-RS in a (sub-)slot is specified/(pre)configured. For example, x consecutive SL symbols are specified/(pre)configured. x is specified in a protocol/(pre)configured.

In some embodiments, an SL symbol(s) preceding an SL CSI-RS symbol is set as an AGC symbol(s).

A time length of AGC may be y symbols. y is specified in a protocol/(pre)configured (for example, x=0, 0.5, 1, 2, . . . ).

Content of the AGC symbol may be filled through UE implementation, or content of the AGC symbol is specified in a protocol/(pre)configured. (For example, an $x^{th}$ CSI-RS sequence may be copied into the AGC symbol; a fixed CSI-RS sequence is filled; a corresponding CSI-RS sequence generated according to a (pre)configuration of a CSI-RS is filled in the AGC symbol).

In some embodiments, a combination of symbols of the AGC and the CSI-RS may be bound to form a resource set of the AGC and the CSI-RS (which may be referred to as a CSI-RS set).

Each (sub-)slot may (pre)configure one or more resource sets. A position of the resource set in a (sub-)slot is defined in a protocol/(pre)configured. The position satisfies any one of the following:

the end of the (sub-)slot;

any position of the (sub-)slot, where for example, an offset relative to a start symbol in the (sub-)slot is configured, or it is specified in a protocol that a symbol used for transmitting a resource set is a symbol with the target resource removed; the target resource includes at least one of the following: a PSSCH symbol, an AGC symbol preceding a PSSCH symbol, an AGC symbol following a PSSCH symbol, a PSFCH symbol, or a GP symbol; or following a PSSCH symbol.

In this embodiment, a (sub-)slot period and an offset of the resource set may be defined in a protocol/(pre)configured (for example, configured per BWP or per resource pool).

In some embodiments, the foregoing CSI-RS/resource set may be separately configured for each panel (antenna panel)/antenna port.

In some embodiments, behavior of UE on the resource set includes one/more of the following:

the UE performs transmission on all symbols of the resource set;

the UE keeps a transmit power unchanged on each symbol of the resource set; or the UE keeps a precoder/panel unchanged on each symbol of the resource set (as shown in FIG. 5 and FIG. 6).

1.2 Frequency Domain Configuration of an SL CSI-RS

In some embodiments, a frequency domain resource of the SL CSI-RS is specified in a protocol/(pre)configured.

In an optional embodiment, an entire BWP/resource pool/carrier is specified/(pre)configured.

In another embodiment, a frequency domain transmission resource of the SL CSI-RS may be indicated based on a BWP/resource pool/carrier/sub-channel. For example, a start position and length is specified/(pre)configured; or it is specified/(pre)configured that the frequency domain transmission resource of the SL CSI-RS is indicated by using a bitmap.

In some embodiments, the frequency domain resource of the SL CSI-RS may be divided into a plurality of sub-bands. The division may be specified/(pre)configured.

It may be specified/(pre)configured that each sub-band has the same quantity of frequency domain resources; or it may be specified that a sub-band may be a basic unit of transmitting a CSI-RS. When transmitting the SL CSI-RS, the UE may perform frequency hopping in different sub-bands. A manner of the frequency hopping may include any one of the following:

performing frequency hopping in a resource set;

performing frequency hopping between resource sets;

performing frequency hopping in a (sub-)slot; or performing frequency hopping between (sub-)slots.

In some embodiments, rules of an NR Uu SRS may be reused for a sequence of an SL CSI-RS, resource mapping, antenna port mapping, and the like.

1.3 Channel Multiplexing

In some embodiments, multiplexing of a resource set and a PSCCH/PSSCH may include time division multiplexing. Specifically, a manner of time division multiplexing is any one of the following:

a resource set is excluded in a configuration of a PSCCH/PSSCH; or transmission of a PSCCH/PSSCH and transmission of a resource set conflict in time domain, and rate matching/puncturing is performed on the transmission of the PSCCH/PSSCH.

In some embodiments, multiplexing of a resource set and a PSFCH may include frequency division multiplexing. Specifically, a manner of frequency division multiplexing is any one of the following:

(pre)configuring AGC symbols of a PSFCH and a resource set on one same symbol; or discarding transmission of the PSFCH or transmission of the CSI-RS when the transmission of the PSFCH conflicts with transmission of the resource set.

1.4 Configure a Signaling Procedure

Manner 1: A control node (for example, a base station or scheduling UE or a group head of a UE group) notifies that an SL CSI-RS of each link is configured at a transmit end and a receive end.

For example, the control node performs notification through signaling such as (PC5-)RRC, MAC CE, DCI or SCI. The signaling needs to include at least the following information:

link information, for example, UE IDs of the transmit end and the receive end; and transmit and receive end indication information, for example, a 1-bit flag.

Manner 2: A control node (for example, a base station or scheduling UE or a group head of a UE group) notifies a configuration of an SL CSI-RS of each link to a transmit end, and then the transmit end relays configuration information of the SL CSI-RS to a receive end.

For example, the control node may notify the target configuration information to the transmit end by using signaling such as (PC5-)RRC, a MAC CE, DCI or SCI. Moreover, the signaling needs to include at least the following information: link information, for example, UE IDs of the transmit end and the receive end.

The transmit end may notify the target configuration information to the receive end by using signaling such as PC5-RRC, a MAC CE or SCI.

Manner 3: A control node (for example, a base station or scheduling UE or a group head of a UE group) configures a group of usable SL CSI-RSs for a transmit end. The transmit end determines a configuration of a CSI-RS of each link, and notifies the configuration to a receive end.

For example, the control node may notify the target configuration information to the transmit end by using signaling such as (PC5-)RRC, a MAC CE, DCI or SCI. Moreover, the signaling needs to include at least the following information: link information, for example, UE IDs of the transmit end and the receive end.

The transmit end may notify the target configuration information to the receive end by using signaling such as PC5-RRC, a MAC CE or SCI.

Manner 4: A transmit end determines a configuration of a CSI-RS of each link, and notifies the configuration to a receive end. For example, the transmit end notifies the configuration to the receive end by using signaling such as PC5-RRC, a MAC CE or SCI.

In this embodiment, for the foregoing Manner 3, the control node only needs to perform appropriate control, to reduce the overheads of control signaling, thereby improving the flexibility of configuration on a UE side.

It should be noted that in the foregoing solution 1, a (sub-)slot may be replaced with an SL/logical (sub-)slot or any other time domain unit.

Solution 2: A PSSCH transmitted by UE carries an SL CSI-RS, and transmission of a broadband CSI-RS is implemented in a PSSCH hopping manner.

The frequency domain bandwidth is divided into a plurality of sub-bands.

In some embodiments, the frequency domain bandwidth may be bandwidth of each resource pool/bandwidth of a BWP/bandwidth of a carrier.

The division may be specified/(pre)configured in a standard. For example, one/more parameters in the following are configured:

bandwidth (for example, a quantity of PRBs/sub-channels) of a sub-band;

a start position (for example, a start position of PRBs/sub-channels) of a sub-band; and a sub-band carrier.

In some embodiments, each (sub-)slot is divided into a plurality of sub-time domain units. The division may be specified/(pre)configured in a standard. For example, one/more parameters in the following are configured:

a length (for example, a quantity of symbols) of a sub-time domain unit;

a start position (for example, a start position of symbols) of a sub-time domain unit; or an interval of a sub-domain unit.

Each sub-time domain unit may carry the SL CSI-RS.

In some embodiments, it is specified in a protocol/(pre)configured that frequency hopping may be performed between sub-bands in transmission on each sub-time domain unit. For example, according to the following frequency hopping rule: a sub-frequency domain unit $T\_i$ corresponding to an $i^{th}$ sub-time domain unit, where $T\_i=(T\_1+(I-1)*Q)$ mod K, where i is an integer greater than 1 and less than or equal to L, $T\_i$ denotes a sub-band corresponding to an $i^{th}$ third time domain unit, $T\_1$ denotes a sub-band corresponding to the first third time domain unit, and Q denotes a step size of the frequency hopping.

Figure 9:
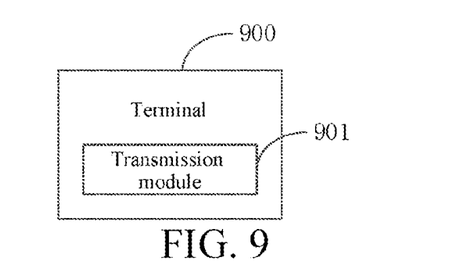
FIG. 9 is a structural diagram of a terminal according to an embodiment of the present disclosure.

FIG. 9 is a structural diagram of a terminal according to an embodiment of the present disclosure. As shown in FIG. 9, the terminal 900 includes:

a transmission module 901, configured to transmit a target signal in all or part of frequency domain bandwidth of a sidelink according to target configuration information, where the target signal includes a channel measurement reference signal.

In some embodiments, the target configuration information includes a time domain configuration of the target signal and a frequency domain configuration of the target signal.

In some embodiments, the target signal further includes an automatic gain control AGC signal, and the time domain configuration is used for configuring a quantity of first time domain units occupied by the channel measurement reference signal and a quantity of first time domain units occupied by the AGC signal within a second time domain unit for transmitting the target signal.

In some embodiments, the time domain configuration is used for configuring that the second time domain unit for transmitting the target signal includes at least one resource set, and the resource set includes a combination formed by binding the first time domain units occupied by the channel measurement reference signal and the first time domain units occupied by the AGC signal.

In some embodiments, a frequency domain resource of the target signal includes M sub-bands, and M is an integer greater than 1.

In some embodiments, the M sub-bands meet at least one of the following:

each sub-band has the same quantity of frequency domain resources; or the sub-band is a basic unit of transmitting the target signal.

In some embodiments, during the transmission of the target signal, a manner of performing frequency hopping in the M sub-bands includes any one of the following:

performing frequency hopping in a resource set;
performing frequency hopping between resource sets;
performing frequency hopping in a time domain unit; or
performing frequency hopping between time domain units,
where the resource set includes a combination formed by binding first time domain units occupied by the channel measurement reference signal and first time domain units occupied by an AGC signal.

In some embodiments, the target configuration information is used for configuring that the channel measurement reference signal is carried by a PSSCH, and a frequency hopping rule is preset to transmit the target signal.

In some embodiments, the frequency domain bandwidth includes K sub-bands, and K is an integer greater than 1; and one second time domain unit for transmitting the target signal includes L third time domain units, and L is an integer greater than 1.

In some embodiments, the preset frequency hopping rule includes: performing frequency hopping between the sub-bands in transmission of each third time domain unit.

In some embodiments, the performing frequency hopping between the sub-bands in transmission of each third time domain unit includes:
performing frequency hopping according to $T\_i=(T\_1+(i-1)*Q) \bmod K$,
where i is an integer greater than 1 and less than or equal to L, $T\_i$ denotes a sub-band corresponding to an $i^{th}$ third time domain unit, $T\_1$ denotes a sub-band corresponding to the first third time domain unit, and Q denotes a step size of the frequency hopping.

The terminal provided in the embodiments of the present disclosure can implement various processes implemented by the terminal in the method embodiment of FIG. 2. To avoid repetition, details are not described herein again.

Figure 10:
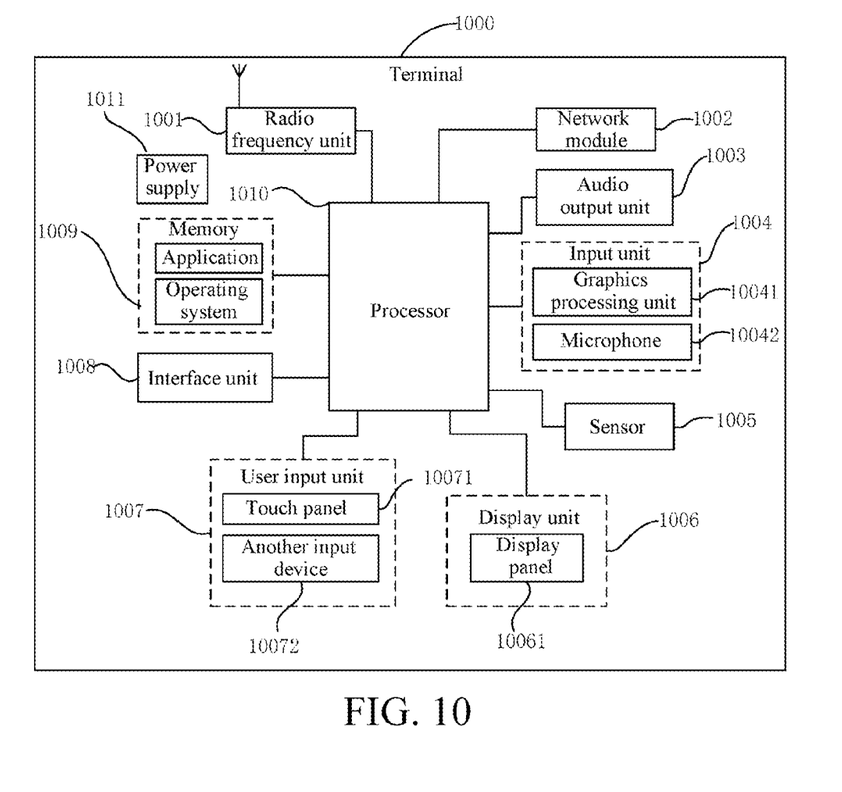
FIG. 10 is a structural diagram of another terminal according to an embodiment of the present disclosure.

FIG. 10 is a schematic diagram of a hardware structure of a terminal according to various embodiments of the present disclosure.

The terminal 1000 includes, but is not limited to, components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that a terminal structure shown in FIG. 10 constitutes no limitation on the terminal, and the terminal may include more or fewer components than those shown in the figure, or some components may be combined, or a different component deployment may be used. In the embodiments of the present disclosure, the terminal includes, but is not limited to, a mobile phone, a tablet computer, a notebook computer, a palmtop computer, an in-vehicle terminal, a wearable device, a pedometer, and the like.

The radio frequency unit 1001 is configured to transmit a target signal in all or part of frequency domain bandwidth of a sidelink according to target configuration information, where the target signal includes a channel measurement reference signal.

It should be understood that in this embodiment, the foregoing processor 1010 or radio frequency unit 1001 provided in the embodiment of the present disclosure can implement various processes implemented by the terminal in the method embodiment of FIG. 2. To avoid repetition, details are not described herein again.

It should be understood that in the embodiments of the present disclosure, the radio frequency unit 1001 may be configured to receive and send a signal during an information receiving and sending process or a call process. Specifically, the radio frequency unit receives downlink data from a base station, and then delivers the downlink data to the processor 1010 for processing; and in addition, sends uplink data to the base station. Generally, the radio frequency unit 1001 includes, but is not limited to, an antenna, at least one amplifier, a transceiver, a coupler, a low noise amplifier, a duplexer, and the like. In addition, the radio frequency unit 1001 may further communicate with another device through a wireless communication system.

The terminal provides wireless broadband Internet access for a user by using the network module 1002, for example, helps the user to receive and send an email, browse a webpage, and access stream media, and the like.

The audio output unit 1003 may convert audio data received by the radio frequency unit 1001 or the network module 1002 or stored in the memory 1009 into an audio signal and output the audio signal as sound. Moreover, the audio output unit 1003 may provide an audio output (such as call signal receiving sound or message receiving sound) related to a specific function executed by the terminal 1000. The audio output unit 1003 includes a loudspeaker, a buzzer, a receiver, and the like.

The input unit 1004 is configured to receive an audio signal or a video signal. The input unit 1004 may include a graphics processing unit (GPU) 10041 and a microphone 10042. The GPU 10041 processes image data of a static picture or a video that is obtained by an image acquisition apparatus (for example, a camera) in a video acquisition mode or an image acquisition mode. An image frame that has been processed may be displayed on a display unit 1006. The image frame that has been processed by the GPU 10041 may be stored in the memory 1009 (or another storage medium) or sent by using the radio frequency unit 1001 or the network module 1002. The microphone 10042 may receive a sound, and can process the sound into audio data. The processed audio data may be converted, in a phone talk mode, into a format that may be sent to a mobile communication base station via the radio frequency unit 1001 for output.

The terminal 1000 further includes at least one sensor 1005 such as an optical sensor, a motion sensor, and other sensors. Specifically, the optical sensor includes an ambient light sensor and a proximity sensor, where the ambient light sensor may adjust the luminance of the display panel 10061 according to the luminance of the ambient light, and the proximity sensor may switch off the display panel 10061 and/or backlight when the terminal 1000 is moved to the ear. As one type of motion sensor, an acceleration sensor may detect the magnitude of accelerations in various directions (generally on three axes), may detect magnitude and a direction of the gravity when static, and may be configured to recognize the attitude of the mobile phone (for example, switching between landscape orientation and portrait orientation, a related game, and magnetometer attitude calibration), a function related to vibration recognition (such as a pedometer and a knock), and the like. The sensor 1005 may further include a fingerprint sensor, a pressure sensor, an iris sensor, a molecular sensor, a gyroscope, a barometer, a hygrometer, a thermometer, and an infrared sensor, and the like. Details are not described herein again.

The display unit 1006 is configured to display information input by the user or information provided for the user. The display unit 1006 may include a display panel 10061, and the display panel 10061 may be configured by using a liquid crystal display (LCD), an organic light-emitting diode (OLED), or the like.

The user input unit 1007 may be configured to receive input digit or character information, and generate key signal input related to the user setting and function control of the terminal. Specifically, the user input unit 1007 includes a touch panel 10071 and another input device 10072. The touch panel 10071, also referred to as a touchscreen, may collect a touch operation of a user on or near the touch panel (such as an operation of a user on or near the touch panel 10071 by using any suitable object or attachment, such as a finger or a touch pen). the touch panel 10071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1010. Moreover, the touch controller receives and executes a command sent from the processor 1010. In addition, the touch panel 10071 may be implemented by using various types, such as a resistive type, a capacitive type, an infrared type, and a surface acoustic wave type. In addition to the touch panel 10071, the user input unit 1007 may further include the another input device 10072. Specifically, another input device 10072 may include, but not limited to, a physical keyboard, a functional key (such as a volume control key or a switch key), a track ball, a mouse, and a joystick. Details are not described herein again.

Further, the touch panel 10071 may cover the display panel 10061. After detecting a touch operation on or near the touch panel 10071, the touch panel 10071 transfers the touch operation to the processor 1010, so as to determine a type of the touch event. Then, the processor 1010 provides corresponding visual output on the display panel 10061 according to the type of the touch event. Although, in FIG. 10, the touch panel 10071 and the display panel 10061 are used as two separate parts to implement input and output functions of the terminal, in some embodiments, the touch panel 10071 and the display panel 10061 may be integrated to implement the input and output functions of the terminal, which are not limited herein.

The interface unit 1008 is an interface for connecting an external apparatus to the terminal 1000. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 1008 may be configured to receive an input (such as data information or electric power) from an external apparatus and transmit the received input to one or more elements in the terminal 1000 or may be configured to transmit data between the terminal 1000 and an external apparatus.

The memory 1009 may be configured to store a software program and various data. The memory 1009 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 1009 may include a high-speed random access memory, and may further include a nonvolatile memory, such as at least one magnetic disk storage device, a flash memory, or another volatile solid-state storage device.

The processor 1010 is the control center of the terminal, and is connected to various parts of the terminal by using various interfaces and lines. By running or executing the software program and/or module stored in the memory 1009, and invoking data stored in the memory 1009, the processor 1010 performs various functions and data processing of the terminal, thereby performing overall monitoring on the terminal. The processor 1010 may include one or more processing units. The processor 1010 may integrate an application processor and a modem processor. The application processor mainly processes an operating system, a user interface, an application, and the like. The modem processor mainly processes wireless communication. It may be understood that the foregoing modem processor may not be integrated into the processor 1010.

The terminal 1000 further includes a power supply 1011 (such as a battery) for supplying power to the components. The power supply 1011 may be logically connected to the processor 1010 by using a power management system, thereby implementing functions such as charging, discharging, and power consumption management by using the power management system.

In addition, the terminal 1000 includes some functional modules that are not shown. Details are not described herein again.

The embodiments of the present disclosure further provide a terminal, including the processor 1010 and the memory 1009 and a computer program stored in the memory 1009 and capable of being run on the processor 1010, where the computer program implements various processes of the embodiments of the foregoing transmission method for a channel measurement reference signal when being executed by the processor 1010, and can achieve the same technical effects. To avoid repetition, details are not described herein again.

Embodiments of the present disclosure further provide a computer-readable storage medium, storing a computer program, where the computer program, when executed by a processor, implements various processes of the embodiments of the transmission method for a channel measurement reference signal on a terminal side provided in the embodiments of the present disclosure, and can achieve the same technical effects. To avoid repetition, details are not described herein again. The computer-readable storage medium is, for example, a read-only memory (ROM), a random access memory (RAM), a magnetic disk, an optical disc, or the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a base station, or the like) to perform the methods described in the embodiments of the present disclosure.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A method for transmitting a channel measurement reference signal, performed by a terminal, comprising:
    transmitting a target signal in all or part of frequency domain bandwidth of a sidelink according to target configuration information, wherein the target signal comprises the channel measurement reference signal;
    wherein the target configuration information comprises a time domain configuration of the target signal and a frequency domain configuration of the target signal; and
    wherein the target signal further comprises an automatic gain control (AGC) signal, and the time domain configuration is used for configuring a quantity of first time domain units occupied by the channel measurement reference signal and a quantity of first time domain units occupied by the AGC signal within a second time domain unit for transmitting the target signal.

2. The method according to claim 1, wherein the time domain configuration is used for configuring that the second time domain unit for transmitting the target signal comprises at least one resource set, and the resource set comprises a combination formed by binding the first time domain units occupied by the channel measurement reference signal and the first time domain units occupied by the AGC signal.

3. The method according to claim 2, wherein in the resource set, the first time domain units occupied by the channel measurement reference signal are located following the first time domain units occupied by the AGC signal; or
    the first time domain units occupied by the channel measurement reference signal and the first time domain units occupied by the AGC signal are adjacent in time domain.

4. The method according to claim 2, wherein when a quantity of the resource sets is greater than 1, the resource sets are consecutive in time domain.

5. The method according to claim 2, wherein a position of the at least one resource set in the second time domain unit meets any one of the following:
    N first time domain units occupied by the at least one resource set are N first time domain units located at the end of the second time domain unit, wherein N is a positive integer;
    N first time domain units occupied by the at least one resource set are located at any positions in the second time domain unit; or
    N first time domain units occupied by the at least one resource set are located following the last first time domain unit occupied by a physical sidelink shared channel (PSSCH).

6. The method according to claim 2, wherein a first object in each first time domain unit of the resource set is kept unchanged, and the first object comprises at least one of the following:
    a transmit power;
    a precoder;
    a matrix; or
    an antenna panel.

7. The method according to claim 2, wherein the resource set and a third object are time division multiplexed or frequency division multiplexed, and the third object is at least one of a physical sidelink control channel (PSCCH), a physical sidelink shared channel (PSSCH), or a physical sidelink feedback channel (PSFCH).

8. The method according to claim 7, wherein in a case that the third object is the PSCCH or the PSSCH and the resource set and the third object are time division multiplexed, the third object and the resource set meet any one of the following:
    a time domain resource configuration of the third object does not comprise the resource set; or
    in a case that transmission of the third object and transmission of the resource set conflict in time domain, rate matching or puncturing is performed on the transmission of the third object;
    or wherein in a case that the third object is the PSFCH and the resource set and the third object are time division multiplexed, the third object and the resource set meet any one of the following:
    AGC signals of the third object and the resource set are in the same first time domain unit; or
    in a case that transmission of the third object and transmission of the resource set conflict in time domain, the transmission of the third object or the transmission of the resource set is discarded.

9. The method according to claim 1, wherein the time domain configuration corresponds one to one to a second object, and the second object is an antenna panel or an antenna port.

10. The method according to claim 1, wherein a frequency domain resource of the target signal comprises M sub-bands, and M is an integer greater than 1.

11. The method according to claim 1, wherein the frequency domain configuration is further used for indicating a frequency domain resource of the target signal according to at least one of the following:
    the frequency domain resource is indicated based on a Bandwidth Part (BWP);
    the frequency domain resource is indicated based on a resource pool;
    the frequency domain resource is indicated based on a carrier; or
    the frequency domain resource is indicated based on a sub-channel.

12. The method according to claim 1, wherein in a case that the terminal is a transmit end of sidelink transmission, before the transmitting a target signal in all or part of frequency domain bandwidth of a sidelink according to target configuration information, the method further comprises:

receiving a first configuration corresponding to each sidelink transmitted by a control node, wherein the first configuration comprises the target configuration information.

13. The method according to claim 12, wherein after the receiving a first configuration corresponding to each sidelink transmitted by a control node, the method further comprises:
forwarding the corresponding target configuration information to a receive end of the sidelink transmission.

14. The method according to claim 1, wherein in a case that the terminal is a transmit end of sidelink transmission, before the transmitting a target signal in all or part of frequency domain bandwidth of a sidelink according to target configuration information, the method further comprises:
determining the target configuration information corresponding to each time of sidelink transmission; and
transmitting the corresponding target configuration information to a receive end of the sidelink transmission.

15. The method according to claim 1, wherein in a case that the terminal is a receive end of sidelink transmission, before the transmitting a target signal in all or part of frequency domain bandwidth of a sidelink according to target configuration information, the method further comprises any one of the following:
receiving a first configuration corresponding to each sidelink transmitted by a control node, wherein the first configuration comprises the target configuration information; or
receiving the target configuration information transmitted by a transmit end of the sidelink transmission.

16. The method according to claim 1, wherein the target configuration information is used for configuring that the target signal is carried by a physical sidelink shared channel (PSSCH), and a frequency hopping rule is preset to transmit the target signal.

17. A terminal, comprising a memory storing a computer program and a processor coupled to the memory and configured to execute the computer program to perform a method for transmitting a channel measurement reference signal, the method comprising:
transmitting a target signal in all or part of frequency domain bandwidth of a sidelink according to target configuration information, wherein the target signal comprises the channel measurement reference signal; wherein the target configuration information comprises a time domain configuration of the target signal and a frequency domain configuration of the target signal; and
wherein the target signal further comprises an automatic gain control (AGC) signal, and the time domain configuration is used for configuring a quantity of first time domain units occupied by the channel measurement reference signal and a quantity of first time domain units occupied by the AGC signal within a second time domain unit for transmitting the target signal.

18. A non-transitory computer-readable storage medium, storing a computer program, when the computer program is executed by a processor, performs a method for transmitting a channel measurement reference signal, the method comprising:
transmitting a target signal in all or part of frequency domain bandwidth of a sidelink according to target configuration information, wherein the target signal comprises the channel measurement reference signal; wherein the target configuration information comprises a time domain configuration of the target signal and a frequency domain configuration of the target signal; and
wherein the target signal further comprises an automatic gain control (AGC) signal, and the time domain configuration is used for configuring a quantity of first time domain units occupied by the channel measurement reference signal and a quantity of first time domain units occupied by the AGC signal within a second time domain unit for transmitting the target signal.

* * * * *